United States Patent
Fujita

(10) Patent No.: US 8,048,509 B2
(45) Date of Patent: Nov. 1, 2011

(54) LAMINATED CORE AND METHOD OF PRODUCING LAMINATED CORE

(75) Inventor: Katsufusa Fujita, Fukuoka (JP)

(73) Assignee: Mitsui High-Tec, Inc. (JP)

( * ) Notice: Subject to any disclaimer, the term of this patent is extended or adjusted under 35 U.S.C. 154(b) by 0 days.

(21) Appl. No.: 10/250,848

(22) PCT Filed: May 23, 2002

(86) PCT No.: PCT/JP02/04976
§ 371 (c)(1),
(2), (4) Date: Jul. 1, 2003

(87) PCT Pub. No.: WO02/097948
PCT Pub. Date: Dec. 5, 2002

(65) Prior Publication Data
US 2004/0056556 A1  Mar. 25, 2004

(30) Foreign Application Priority Data
May 25, 2001  (JP) .............................. P. 2001-157239

(51) Int. Cl.
*B32B 3/24* (2006.01)
*H01F 3/02* (2006.01)

(52) U.S. Cl. ........ 428/133; 428/131; 428/134; 428/137; 428/156; 428/172; 428/174; 428/594; 310/216.048

(58) Field of Classification Search .................. 428/131, 428/133, 134, 137, 156, 172, 174, 594; 310/216.048
See application file for complete search history.

(56) References Cited

U.S. PATENT DOCUMENTS

| 3,834,487 | A | * | 9/1974 | Hale .............................. 181/292 |
| 4,160,182 | A |   | 7/1979 | Yoshiaki |
| 4,658,502 | A | * | 4/1987 | Eckold et al. ................... 29/798 |
| 5,075,150 | A | * | 12/1991 | Webb et al. ................... 428/162 |
| 5,443,887 | A | * | 8/1995 | Nakao ........................... 428/137 |
| 5,551,702 | A | * | 9/1996 | Inamura ........................ 277/598 |
| 5,806,857 | A | * | 9/1998 | Mockenhaupt et al. ...... 277/595 |
| 5,923,112 | A | * | 7/1999 | Bertocchi et al. ............. 310/217 |
| 6,009,607 | A | * | 1/2000 | Bertocchi et al. ............ 29/33 K |
| 6,265,802 | B1 | * | 7/2001 | Getschmann .......... 310/216.004 |

FOREIGN PATENT DOCUMENTS

| DE | 4009813 C1 | 1/1991 |
| EP | 0847109 A2 | 6/1998 |
| EP | 0903837 A2 | 3/1999 |
| JP | 48-20003 A | 3/1973 |
| JP | 58-90041 | 6/1983 |
| JP | 61 2744 U | 1/1986 |
| JP | 2 8005 U | 1/1990 |

(Continued)

*Primary Examiner* — William P Watkins, III
(74) *Attorney, Agent, or Firm* — Wood, Phillips, Katz, Clark & Mortimer

(57) ABSTRACT

Thin sheets of magnetic material are subjected to a pressing process to stamp many sheets of core pieces, and caulking projections defined in the core pieces are caused to go into connecting through holes defined in the core pieces for connecting and laminating to produce a laminated core. In lower layer of the core pieces having the caulking projections arranged in different positions seeing in plan, at least two sheets of core pieces and other core pieces having the connecting through holes are provided. The caulking projections defined in the core pieces have projecting length of at least twice of thickness of the core pieces, and are fitted in the connecting through holes, so that upper and lower laminated core pieces are unified.

16 Claims, 8 Drawing Sheets

FOREIGN PATENT DOCUMENTS

| | | |
|---|---|---|
| JP | 2 26255 A | 1/1990 |
| JP | 07185695 A | 7/1995 |
| JP | 7-322536 | 12/1995 |
| JP | 322536 A | 12/1995 |
| JP | 9-294343 A | 11/1997 |
| JP | 11-113195 | 4/1999 |
| JP | 2000-037051 | 2/2000 |
| JP | 2000 245083 A | 9/2000 |

* cited by examiner

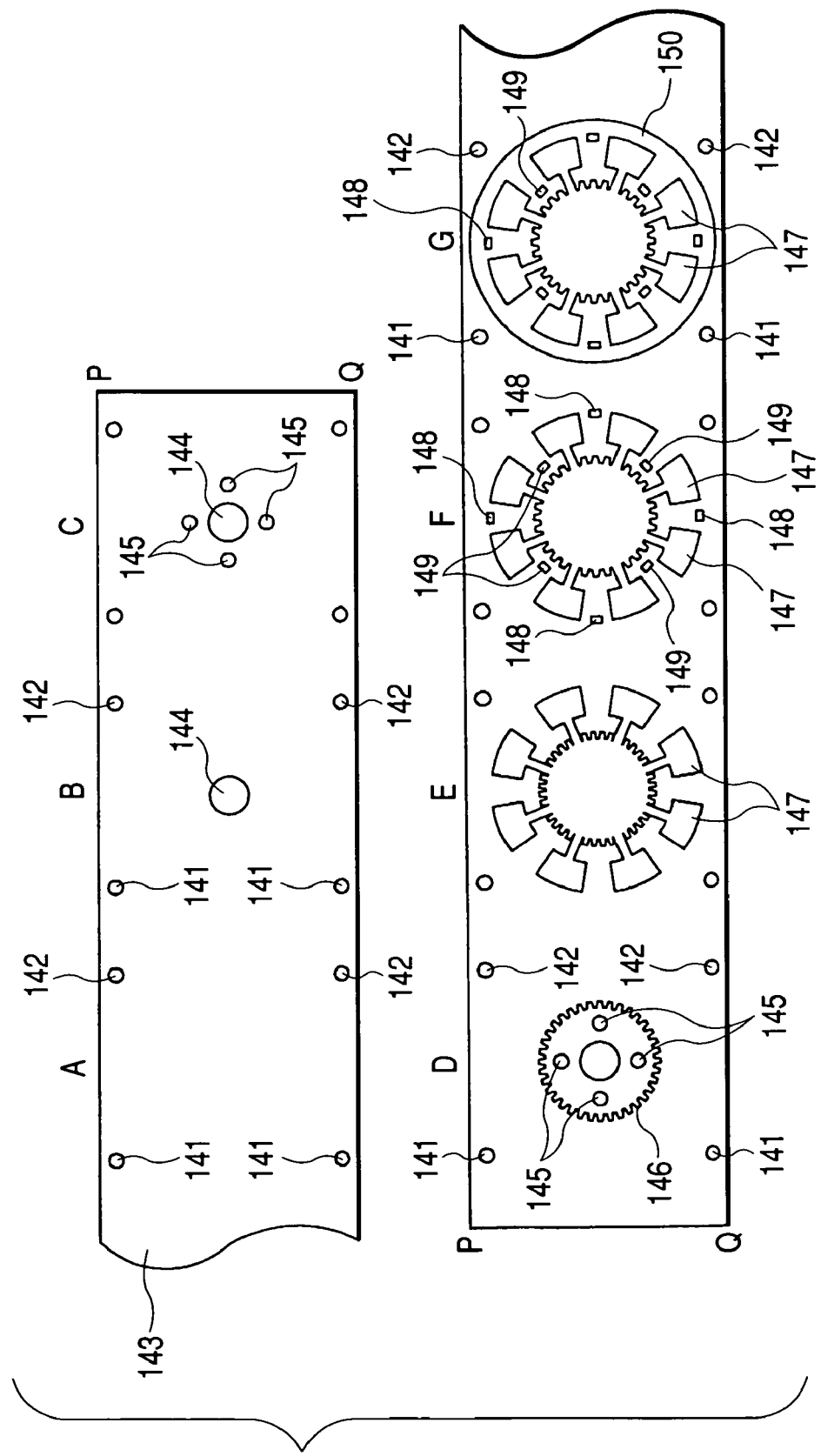

US 8,048,509 B2

LAMINATED CORE AND METHOD OF PRODUCING LAMINATED CORE

TECHNICAL FIELD

This invention relates to a laminated core made by laminating thin sheets having magnetism (for example, silicon steel sheet), and a method of producing the same. Herein, the laminated core is used to, e.g., rotors or stators of electric motors.

BACKGROUND OF THE INVENTION

Conventionally, for heightening output of motors, or attaining small size, light weight and high performance of the same, rotor cores or stator cores have been applied with laminated cores of predetermined thickness made by laminating many core pieces punched from thin steel sheets by pressing works. When laminating many sheets of thin core pieces, caulk-connection portions such as a V-shaped projections or a cut-and-rising portions (or embossed projections) are provided per each of core pieces, and core pieces are caulked one another via caulk-connection portions and laminated one another.

However, if thickness of the core piece is, e.g., less than 0.2 mm, at the caulk-connection portion such as the V-shaped projections or the cut-and-rising portions, length for connecting upper and lower cores is too short, it has been difficult to realize enough caulking strength. Therefore, since the caulking strength between the respective core pieces composing the laminated core is low, problems have been involved with assembled laminated core being peeled or caused with poor shape.

The invention has been made in view of these circumstances, and it is an object of the invention to provide a laminated core which has the caulk-connecting strength though core pieces have thickness of less than 0.2 mm, and causing neither peel nor poor shapes, and a method of producing the same.

DISCLOSURE OF THE INVENTION

The laminated core according to the invention for satisfying the above mentioned object comprises: core pieces formed with caulking projections having length projecting at least twice of thickness of core pieces, and at least two sheets of core pieces respectively laminated under said core pieces formed with said caulking projections and formed with connecting through holes for fitting said caulking projections, and said core pieces which are formed with said caulking projections are formed with parts (namely, lower connecting holes, punched holes) of the connecting through holes for fitting the caulking projections of upper core layers at places which are different from places forming the caulking projections formed in the core pieces, that is, connected with the cores laminated thereon. It is possible thereby to secure thickness (length) of the connecting through hole for fitting the caulking projection. The core piece at the bottom of the connecting through hole for fitting the caulking projection may be a core piece at a still lower position than the core defined with the caulking projection at a place of a subsequent lower layer. The laminated core is made yet stronger thereby.

In the laminated core according to the invention, it is preferable that the caulking projection has a base portion reducing the width as going in a front end direction, and, among the connecting through holes formed in said plural core pieces, the connecting through hole of the core piece immediately under said core piece formed with the caulking projection has the width widening than said width of said caulking projection. Thereby, the caulking projection easily goes into the core immediately under the core piece defined with the caulking projection, and after the core piece goes a little thereinto, the connecting through hole (the upper connecting hole) of the core piece is a guide for the caulking projection.

In the laminated core according to the invention, it is preferable that the connecting through hole formed in the core piece is partially defined at circumference with concaves. Thereby, the caulking projection partially goes into the core piece, and the caulking strength increases.

In the laminated core according to the invention, it is preferable that the concaves are two or more, and the respective concaves are defined symmetrically with respect to the axis of the connecting through hole. Thereby, the caulking projection is difficult to generate displacement, and as a result, the core pieces cause no divergence in lamination.

In the laminated core according to the invention, it is preferable that the caulking projection is shaped as nearly trapezoidal or nearly multi-trapezoidal viewing from the side thereof. Thereby, the corner of the caulking projection does not bite into the connecting through hole, or no twist is generated in the caulking projection. In this case, the opposite two sides of the caulking projection may be separated from the core piece, or all the side walls of the caulking projection may be separated from the core piece.

In the laminated core according to the invention, it is preferable that the caulking projection has a front end portion widening the width owing to pressure. Thereby, the caulking projection and the connecting through hole are caught accurately.

A method of producing laminated cores according to the invention, is such a method where caulking projections and connecting through holes are formed in many sheets of core pieces punched in magnetic thin sheets by a pressing apparatus, and caulking connection is performed while laminating these core pieces, and comprises: an A step of punching the plural sheets of core pieces formed with the connecting through holes in the magnetic thin sheets by means of the pressing apparatus, a B step of forming caulking projections passing until the bottoms of the connecting through holes formed in the plural sheets of core pieces laminated in the precedent step, and laminating core pieces formed, in upper places (i.e., places of the upper layers), with punched holes forming parts of connecting through holes for fitting new caulking projections formed in places different from those of said caulking projections, and a C step of laminating core pieces formed with punched holes to be parts of the connecting through holes formed by meeting axes to said punched holes of said core pieces laminated in the B step, and forming plural sheets of core pieces defined with the connecting through holes together with said core pieces laminated in the B step, wherein the B step and the C step are repeated to form the core laminated at a predetermined thickness in said B step as a final process. Thereby, it is possible to produce the laminated core by use of the pressing apparatus, changing places, where the caulking projections bite into a plurality of core pieces, in the laminating direction neighboring in the vertical direction (namely, not to overlap).

In the method of producing the laminated core according to the invention, in the B step as said final process, a process forming the punched hole for defining said connecting through hole is omitted. Thereby, a useless punching process at the uppermost part of the laminated core can be removed.

In the method of producing the laminated core according to the invention, the laminated core is made of a motor core, and after the B step, the laminated core pieces are rotated. Herein, the "laminated core pieces are rotated" signifies that the cores are laminated at a predetermined sheet number, followed by rotating 360 degree/n (n: natural number). Thereby, even if the core pieces have uneven thickness, laminated core of fixed thickness may be formed.

In the method of producing the laminated core according to the invention, the length (thickness) of the caulking projection is larger than a full length of the connecting through hole for fitting the caulking projection, while the caulking projection has a base portion widening the width, and a front end portion of the caulking projection is crushed (that is, widening the width) when laminating. Thereby, the caulking projection and the connecting through hole are caught accurately, and the laminated core is made still stronger.

In the method of producing the laminated core according to the invention, it is preferable that the connecting through hole is evenly defined with a plurality of concaves at least at lower circumference. Thereby, the caulking projection is fitted at the part thereof in the concave to check the caulking projection from getting out.

BRIEF DESCRIPTION OF THE DRAWINGS

FIG. 9 is a schematically explanatory view showing the punching process for a fourth embodiment according to the invention.

MOST PREFERRED EMBODIMENT OF THE INVENTION

With reference to the attached drawings, explanation will be made to the specified embodiments for understanding the invention.

Figure 1:
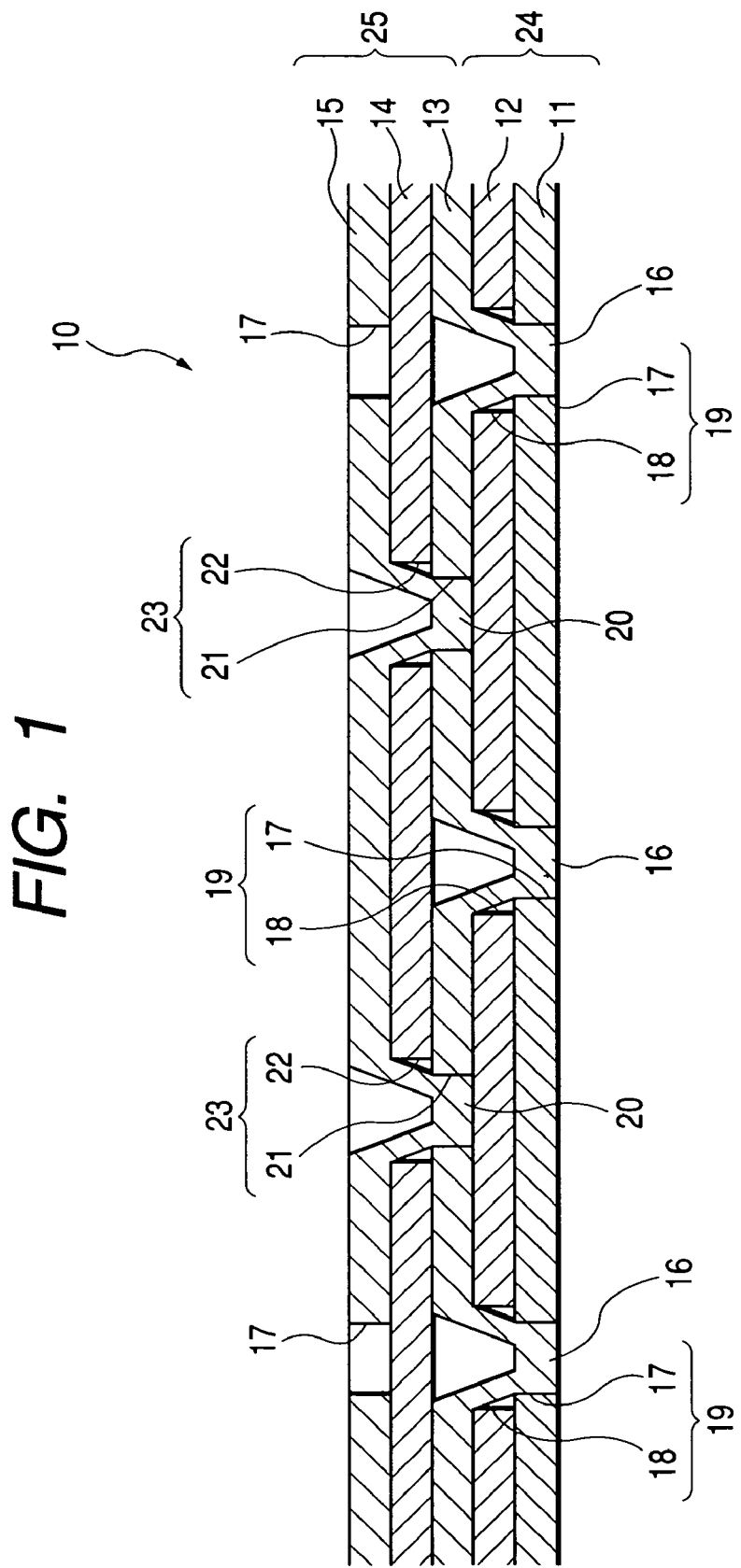
FIG. 1 is a view of schematically explaining the laminated core of a first embodiment according to the invention.
Figure 5:
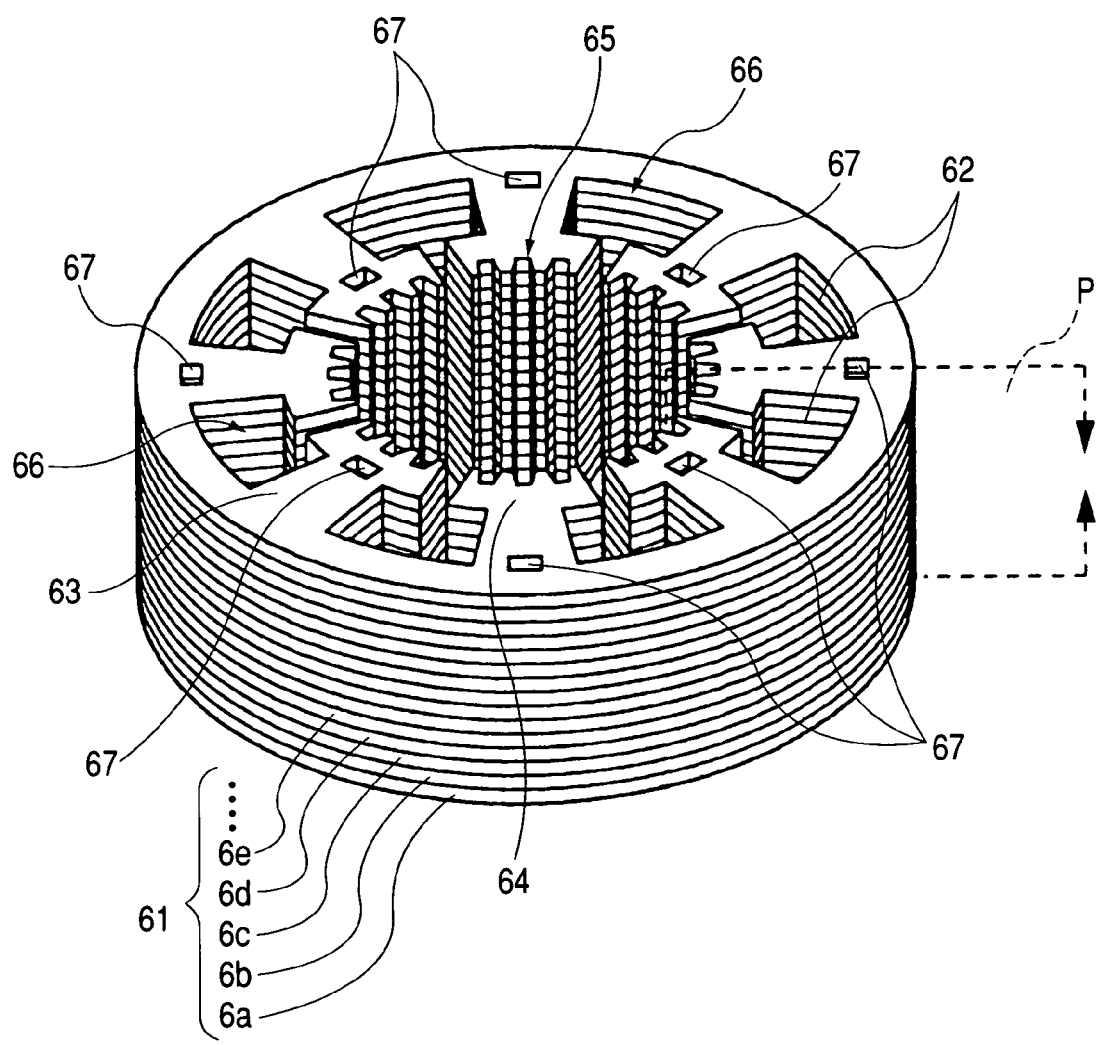
FIG. 5 is a perspective view of the laminated core of a third embodiment according to the invention.

As seeing in FIG. 1, the laminated core 10 of the first embodiment of the invention has five sheets of core pieces 11 to 15 of substantially equal thickness between oppositely facing sides. A plurality of caulking projections 16 defined in the core piece 13 have a projecting length from one of the sides that is equal to twice the thickness of the core piece 13, and are closely fitted in the connecting through hole 19 defined by upper and lower connecting holes 17, 18 formed in the core pieces 11, 12. A plurality of caulking projections 20 defined in the core piece 15 have a projecting length from one of the sides that is equal to twice the thickness of the core piece 15, and are closely fitted in th connecting through hole 23 defined by upper and lower connecting holes 21, 22 formed in the core pieces 13, 14. The positions of defining the respective caulking projections 16, 20 are arranged differently viewing the core pieces 13, 15 in plan, and in more particular, the caulking projections 16, 20 are alternately disposed viewing in plan at a predetermined space. By the way, the actual laminated core is ring shaped seeing in plan as shown in FIG. 5, but in FIG. 1 (also in FIG. 2), it is developed linearly.

As shown in FIG. 1, in this embodiment, the core piece 13 is used in common to a lower laminated part 24 and an upper laminated part 25. The laminated core 10 has the lower laminated part 24 comprising the core pieces 11 to 13 and the upper laminated 25 comprising the core pieces 13 to 15, and these laminated parts 24, 25 are alternately laminated to compose the laminated core 10 of the predetermined thickness. The connecting hole 17 defined in the core piece 15 shows one part of a connecting through hole for fitting therein a caulking projection of a core piece (not shown) at a further upper position.

The connecting holes 17, 18 forming the connecting through hole 19 and the connecting holes 21, 22 forming the connecting through hole 23 are punched holes formed by punching, and are rectangular shape viewing in plan. The connecting holes 18, 22 are respectively larger than the connecting holes 17, 21. The connecting hole 17 and the connecting hole 21 have the same configuration and the same dimension, while the connecting hole 18 and the connecting hole 22 have the same configuration and the same dimension.

The caulking projections 16, 20 fitting in the connecting through holes 19, 23 have twice projecting length of thickness of the core pieces 11 to 15, and the caulking projections 16, 20 have cross sectional shapes of substantially similar or the same rectangles. The caulking projections 16, 20 have base parts shaped in near trapezoid widening width and gradually becoming narrower toward front ends. Further, the caulking projections 16, 20 are formed in the core pieces 13, 15 at predetermined pitch respectively coinciding with the positions of the connecting through holes 19, 23. The caulking projections 16, 20 are closely fitted in the connecting through holes 19, 23, and firmly connected to the core pieces 11 to 13 and the core pieces 13 to 15.

Production of the laminated core 10 comprises, as mentioned later, punching a bar steel of thin iron sheet (magnetic material) by a press working into core pieces 11 to 15 and laminating them in a die furnished in a pressing apparatus. For laminating the core pieces 13, 15 provided with the caulking projections 16, 20, the laminated core pieces are forcibly pressed by actuating a pressing mechanism (for example, a hydraulic cylinder, not shown) connected to later mentioned bottom sheet blocks 129, 130 (see FIG. 7) so as to mate front ends of the caulking projections 16, 20 to the respective connecting through holes 19, 23, thereby enabling to increase strength of the laminated core 10 . In this case, if projecting the caulking projections 16, 20 in a little rang from the bottoms of the core pieces 11, 13 (for example, the projecting length is determined to be 1 to 10% of thickness of the core piece) and forcibly laminating the core pieces, thereby enabling to deform by widening the free front ends of the caulking projections 16, 20 within the connecting holes 17, 21, so that it is possible to firmly secure the caulking projections 16, 20 to the connecting through holes 19, 23.

In addition, since the caulking projections 16, 20 are nearly trapezoidal viewing from the side, the sizes of the connecting holes 18, 22 defined in the core pieces 12, 14 directly contacting the core pieces 13, 15 defined with the caulking projections 16, 20, are determined to be larger than the sizes of the connecting hole 17, 21 defined in the lower core pieces 11, 13. In such manners, the caulking projections 16, 20 can be certainly inserted in the connecting through holes 19, 23 (the same in the following embodiments).

Figure 2:
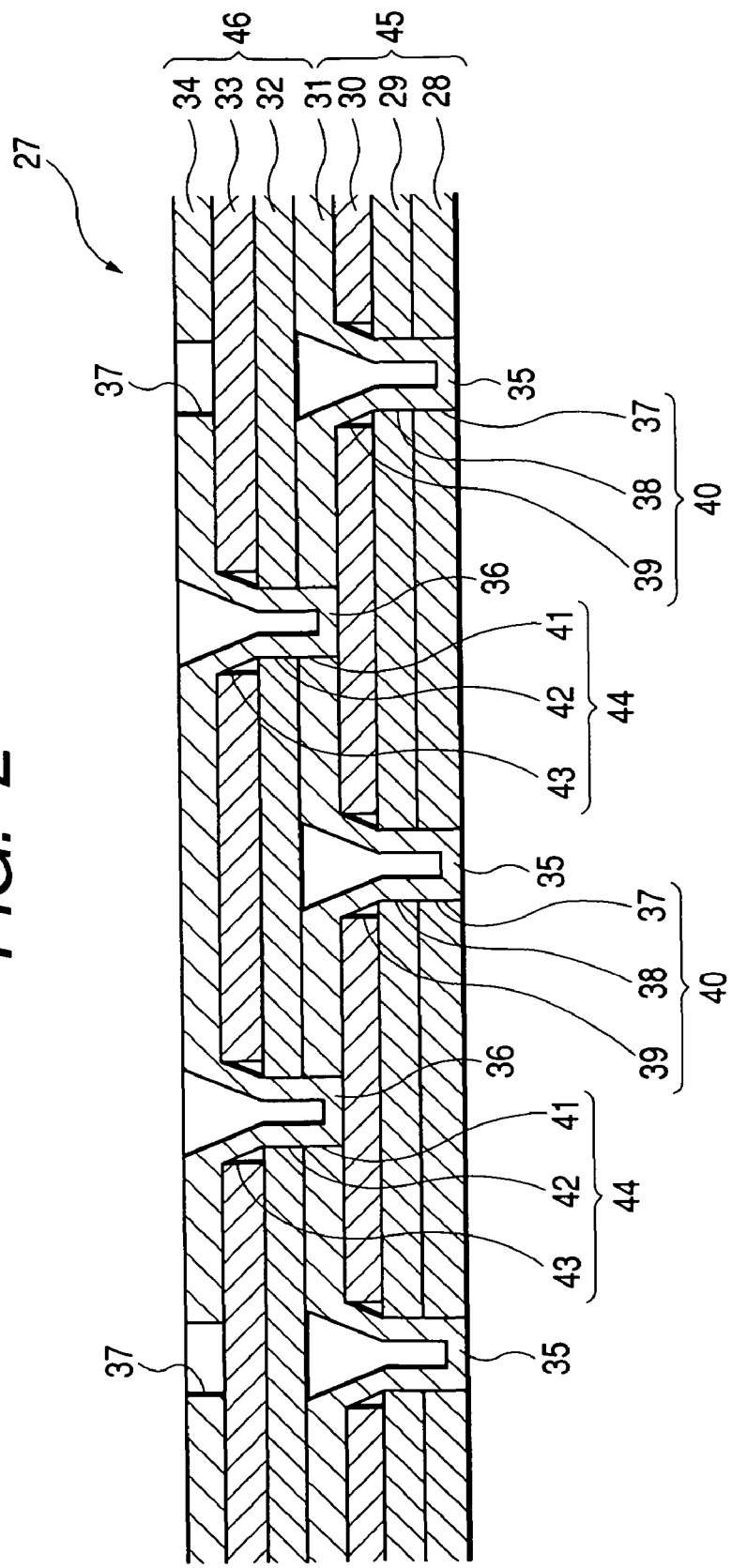
FIG. 2 is a view of schematically explaining the laminated core of a second embodiment according to the invention.

Next, referring to FIG. 2, explanation will be made schematically e to a laminated core 27 of the second embodiment according to the invention. The laminated core 27 has core pieces 28 to 34 of substantially equal thickness, and are provided with caulking projections 35, 36 projecting downward in core pieces 31, 34. The core pieces 28 to 30 are formed with a plurality of connecting through holes 40 comprising lower connecting holes 37, middle connecting holes 38 and upper connecting holes 39, and the caulking projections 35 formed in the core pieces 31 are closely fitted in the connecting through holes 40. Further, the core pieces 31 to 33 are formed with a plurality of connecting through holes 44 comprising lower connecting holes 41, middle connecting holes 42 and upper connecting holes 43, and the caulking projections 36 formed in the core pieces 34 are closely fitted in the connecting through holes 44. Accordingly, in comparison with the laminated core 10 of the first embodiment, the depth of the connecting through holes 40, 44 for fitting the caulking projections 35, 36 is increased by an amount of one sheet of the core piece, and the length projecting downward of the caulking projections 35, 36 grows by three times of the thickness of the core pieces 31, 34, whereby the core pieces 28 to 31 form a lower laminated part 45, while the core pieces 31 to 34 form an upper laminated part. The laminated parts 45, 46 use the core piece 31 in common, and the lower and upper laminated parts 45, 46 are successive and alternately laminated to form the laminated core 27 of the predetermined thickness.

The caulking projections 35, 36 provided in the core pieces 31, 34 are provided at different positions in plan, and are rectangular in cross section and nearly trapezoidal viewing from the side. The lower and middle connecting holes 37, 38 for fitting caulking projection 35 (also as to the caulking projection 36) are rectangular seeing in plan similarly to the cross sectional shape of the front part of the caulking projection 35. The upper connecting hole 39 for fitting the caulking projection 35 is rectangular in plan, and larger than the connecting holes 37, 38 for easily fitting the caulking projection 35. By the way, the connecting holes 37 to 39 forming the connecting through hole 40, the connecting holes 41 to 43 forming the connecting through hole 44, and the caulking projections 35, 36 are formed by the press working, and the caulking projections 35, 36 are laminated in a metal die furnished in the press working apparatus, and the whole laminated core 27 is produced.

Further explanation will be made to the connecting holes 17, 18, 21 22 for fitting the caulking projections 16, 20 shown in FIG. 1, and the connecting holes 37 to 39 and 41 to 43 for fitting the caulking projections 35, 36 shown in FIG. 2. In the above embodiments, all the connecting holes are rectangular (square), but may be circular, elliptical, or polygonal in agreement with shapes of the caulking projections. Also in this case, the connecting hole (the upper connecting hole) formed immediately under the core piece with the caulking projection is preferably larger in one side ranging between, e.g., 10 and 40%.

Figure 3:
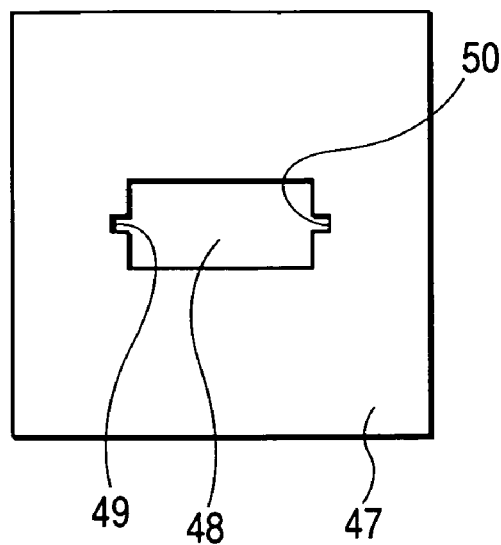
FIG. 3 is a view of schematically explaining concave portions defined in an inner circumference of the connecting through hole.

The lower connecting holes 17, 21 for fitting the caulking projections 16, 20, and the lower and middle connecting holes 37, 38, 41, 42 for fitting the caulking projections 35, 36 are desirably formed with discrete concave parts/cut outs in the circumferences. This situation will be explained by example of FIG. 3. The connecting hole 48 formed in the core piece 47 represents the above mentioned connecting holes 17, 21, 37, 38, 41, 42. The connecting hole 48 formed in the core piece 47 represents the above mentioned connecting holes 17, 21, 37, 38, 41, 42. The connecting hole 48 is rectangular having discrete concaves (cut outs) 49, 50 in both length directions. In this case, the caulking projections (not shown) to be fitted therein are not formed with linear projections to be fitted in the concaves/cut outs 49, 50, but if getting the caulking projection into the connecting hole 48 and forcing it, the caulking projection bites at its one part into the concaves/cut outs 49, 50, so that the caulking projection and the connecting hole 48 are securely fixed. Then, desirably, the caulking projection is projected in a little range (for example, 1 to 10% of the core piece, more preferably 2 to 8%) from a lowermost connecting hole, whereby when laminating the core pieces within the pressing apparatus (otherwise outside of the pressing apparatus), the caulking projection widens the width of its front portion by forcibly pressing up and down, so that is one part bites into the concaves/cut outs 49, 50. At this time, projecting corners of the concaves/cut outs 49, 50 serve as hooks to check the caulking projection from getting out, and play a role of strong caulking connection of the core piece. Thus, the concaves/cut outs are formed to prevent escape of the caulking projection in correspondence to the connecting through holes 19, 23, 40, 41.

Figure 4:
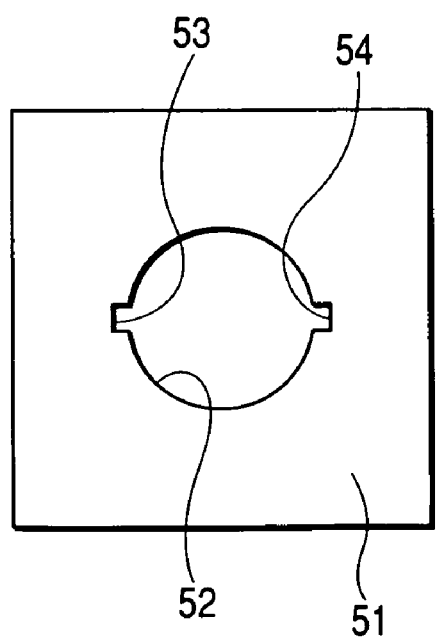
FIG. 4 is an explanatory view showing a conceptual structure of the concave portions defined in the inner circumference of the connecting through hole of a modified example of the laminated core.

The above embodiment is concerned with the rectangular connecting hole, and FIG. 4 shows a case that a circular connecting hole 52 formed in a core piece 51 has discrete concaves/cut outs 53, 54 in both side of the circumference thereof. Also in this case, if fitting the caulking projection into the connecting hole 52 and pressing it up and down, the caulking projection bites at its part into concaves/cut outs 53, 54 to make the caulking connection of the respective core pieces strong. A shape of the caulking projection is nearly trapezoidal.

In a manner that the concaves/cut outs 49, 50, 53, 54 are formed in the connecting holes 48 52, the caulking projection is restrained from free rotation or movement to consequently heighten the caulk-connecting strength as the laminated core and secure stability of the shape.

In the above embodiments, the concaves/cut outs are two for one connecting hole, but the number is not limited. If the concaves/cut outs are more than three for one connecting hole, the concaves/cut outs are desirably formed symmetrically with respect to an axis of the connecting hole, so that the core pieces is prevented from laterally moving during lamination.

Further explanation will be made to a laminated core 61 of the third embodiment of the invention.

As shown in FIG. 5, the laminated core 61 is a stator core of a motor, an outer configuration is shaped in disc, and many core pieces 6a, 6b, 6c, 6d, 6e, 6f, 6g, 6h, 6i . . . (in the following, "6A" represent them) of substantially the same thickness are laminated via the caulking connection. The respective core pieces 6A are defined with eight slots 62 equidistantly in the circumference direction, thereby to define eight magnetic poles 63. The magnetic poles 63 have pole tooth parts 64 at inside front ends for concentrating lines of magnetic force there. Therefore, by laminating the core pieces 6A, at the central part of the laminated core 61, a rotor core hole 65 is defined for receiving rotor cores surrounded by the magnetic poles 63 of the core pieces of stator cores. Further, the laminated core 61 is formed with hollow ranges 66 of slots 62 at the outer circumference side. Herein, the caulking connection of the core pieces 6A is made via caulk-connection portions 67 alternately formed at outsides (basic side) in a radius direction and at insides (front side) in the radius direction. In the following, detailed explanation will be made to the structure of the laminated core 61.

Figure 6:
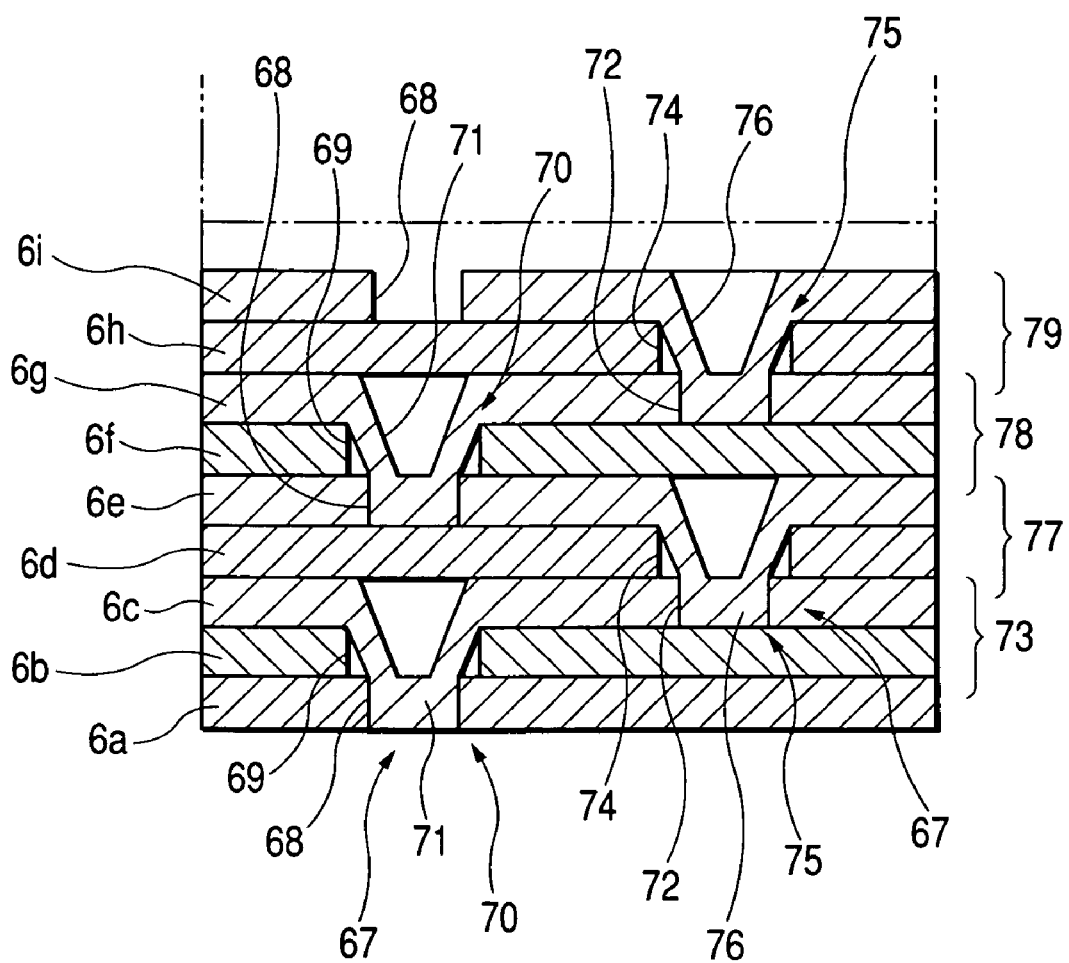
FIG. 6 is a partially cross sectional view of a cut face P in FIG. 5.

FIG. 6 shows a cross sectional structure seen when cutting the laminated core 61 at a cut P (FIG. 5). By the way, FIG. 6 shows the lower part of the cross sectional structure of the laminated core 61.

The core piece 6a of a first layer is defined with a rectangular lower connecting hole (punched hole) 68, seeing in plan. The core piece 6b is defined with a rectangular upper connecting hole (punched hole) 69, seeing in plan, larger than the lower connecting hole 68. The core pieces 6a, 6b are laminated by meeting the axes of the lower connecting hole 68 and the upper connecting hole 69. Thereby, the laminated core pieces 6a, 6b are formed with the connecting through hole 70 composing one part of the caulk-connection portion 67. In addition, the core piece 6c is provided with the caulking projection 71 of a near-trapezoidal shape rectangular seeing in plan and having a long side of a base side seeing from the side, and provided with the rectangular lower connecting hole 72 seeing in plan. By the way, the projecting length of the caulking projection 71 from one of the sides of the associated core piece is substantially twice the thickness of the respective core pieces 6a, 6b. The core piece 6c is laminated on the core piece 6b such that the axis of the caulking projection 71 coincides with the axis of the connecting through hole 70. As a result, if loading in the laminating direction, the caulking projection 71 can be fitted in the connecting through hole 70, so that the core pieces 6a, 6c are caulk-connected to form a first laminated group 73.

The core piece 6d is defined with a rectangular upper connecting hole 74, seeing in plan, larger than the lower connecting hole 72. The core pieces 6c, 6d are laminated by meeting the axes of the lower connecting hole 72 and the upper connecting hole 74. Thereby, the laminated core pieces 6c, 6d are formed with the connecting through hole 75 composing one part of the caulk-connection portion 67. The core piece 6e is provided with the caulking projection 76 of a near-trapezoidal shape rectangular seeing in plan and having a long side as a base side seeing from the side, and provided with the rectangular lower connecting hole 68 seeing in plan. By the way, the projecting length of the caulking projection 76 is twice of thickness of the respective core pieces 6c, 6d. The core piece 6e is laminated on the core piece 6d such that the axis of the caulking projection 76 coincides with the axis of the connecting through hole 75. As a result, if loading in the laminating direction, the caulking projection 76 can be fitted in the connecting through hole 75, so that the core pieces 6c, 6d, 6e are caulk-connected to form a second laminated group 77. The first laminated group 73 and the second laminated group 77 use the core piece 6c in common, and when forming the second laminated group 77, the caulking connection is made between the first laminated group 73 and the second laminated group 77 via the core piece 6c.

Herein, the cross sectional areas in the upper sides of the connecting through holes 70, 75 are larger than those in the lower sides, and the cross sectional areas in the front ends of the caulking projections 71, 76 are smaller than those in the basic ends, whereby the caulking projections 71, 76 can be securely inserted into the connecting through holes 70, 75. The outer circumferences at the front sides of the caulking projections 71, 76 can be closely contacted to the whole inner circumferences of the lower connecting holes 68, 72, while the outer circumferences at the basic sides of the caulking projections 71, 76 can be closely contacted to the inner circumferences at the front ends of the lower connecting holes 69, 74. With the above mentioned structure, the respective core pieces 6a, 6b, 6c, 6d, 6e are firmly connected via the caulk-connection.

Also as to the core pieces 6f, 6g, 6h, 6i . . . , a third laminated group 78 is formed with the core pieces 6e, 6f, 6g, while a fourth laminated group 79 is successively formed with the core pieces 6g, 6h, 6i, and the caulk-connections are made between the respective laminated groups. As to the core pieces 6f, 6g, 6h, 6i . . . , being structurally the same in the lower connecting holes, the upper connecting holes of the core pieces 6b to 6e, and the caulking projections, the same numerals are given them to omit detailed explanations therefore.

Figure 7:
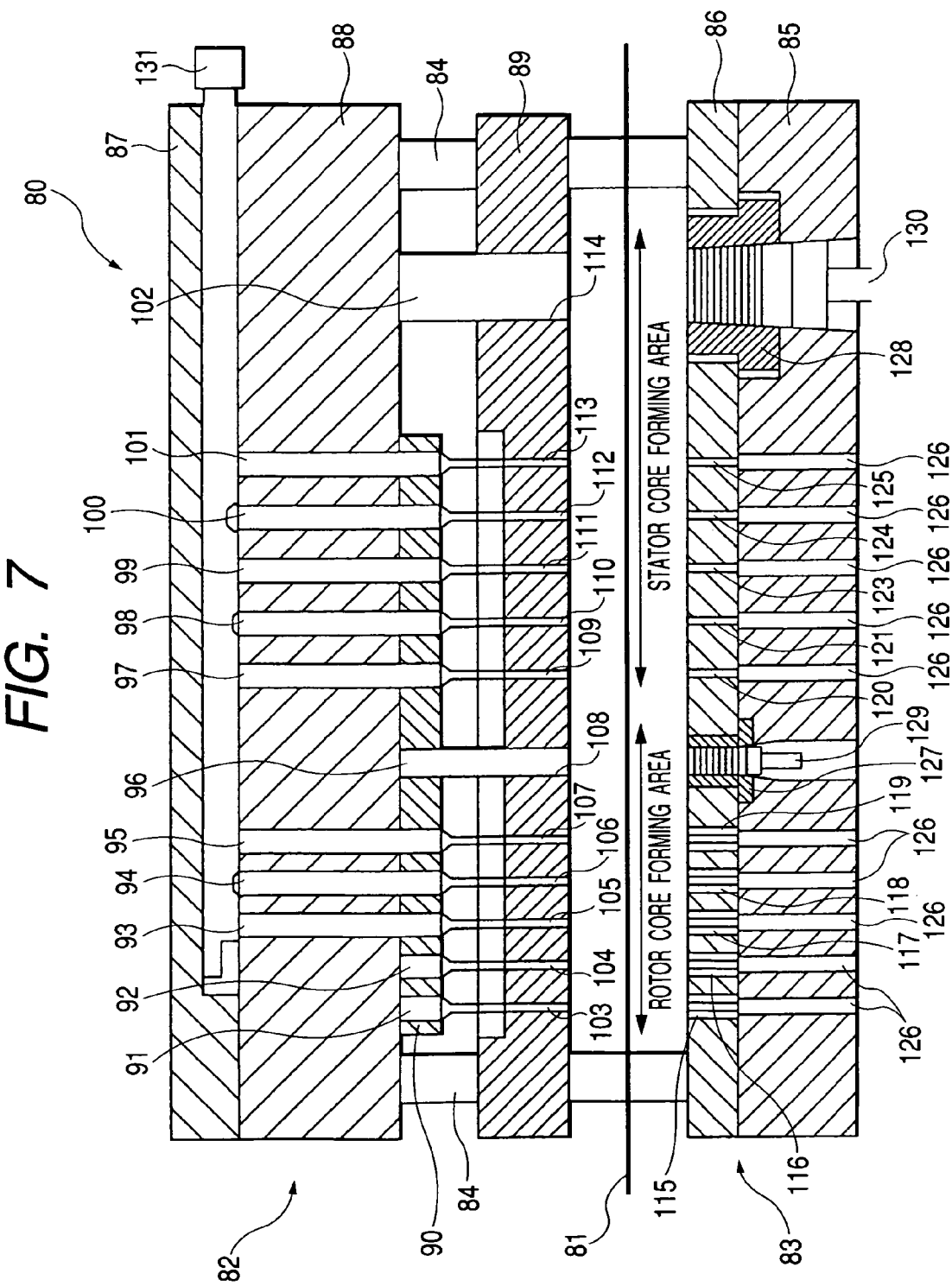
FIG. 7 is a view of conceptually explaining the pressing apparatus for producing the laminated core.

FIG. 7 shows a schematic structure of the pressing apparatus 80 for producing the laminated core (stator core) 61 of the present embodiment and rotor core being the same laminated core to be produced at the same time. The respective core pieces of the stator core and the rotor core are made with the same area (an area of forming core piece) of the same thin sheet bar material, and so the same numerals will be used to the employed core pieces.

The pressing apparatus 80 is provided with a rotor core production area at an upstream side and a stator core production area at a down stream side, and bar materials of magnetic materials (called as briefly "thin sheet 81" hereafter) from which the core pieces 6A are successively punched, are sent intermittently into the rotor core production area a and the stator core production area. An upper die 82 and a lower die 83 for a punching process are communicated through pillars 84, and the lower die 83 is connected to a plunger (not shown) hydraulically driven for vertically moving the upper die 82. The thin sheet 81 is placed between the upper die 82 and the lower die 83, and is synchronized with the pressing actuation of the upper die 82 and the lower die 83, and is transferred intermittently at desired speed.

The lower die 83 has a lower die set 85 connected with the plunger as an elevating mechanism and a die plate 86 provided on the upper side of the lower die set 85. The upper die 82 has an upper die set 87 securing the upper die 82 to a fixed frame (not shown) of the pressing apparatus 80, a punch plate 88 secured to the upper die set 87, and a stripper plate 89 holding the thin sheet 81 together with the die plate 86. In the rotor core production area, the punch plate 88 is provided, via a punch support plate 90, with punches 91, 92, 93, 94, 95 for processing a pilot hole and rotor cores, as well as a rotor core-stamping punch 96. In the stator core production area, the punch plate 88 is provided, via a punch support plate 90, with punches 97, 98, 99, 100, 101 for processing stator cores, as well as a stator core stamping-punch 102. By the way, in this embodiment, the upper die 82 is stationary and the lower die 83 moves vertically, but the invention is also applicable, vice versa, and to a case that the upper and lower dies move vertically as approaching or separating concurrently.

The stripper plate 89 is provided with punches 91 to 95 for processing the pilot hole and the rotor cores, the rotor core-stamping punch 96, the stator core-processing punches 97 to 101, and the through-holes 103 to 114 for passing a stator core-stamping punch 102. The die plate 86 is provided with die holes 115 to 121 and 123 to 125 for inserting punched pieces by the punches 91 to 95 and 97 to 101. The lower die set 85 is provided with exhaust holes 126 continuing to the die holes 115 to 121 and 123 to 125 for exhausting punched pieces.

Immediately under the stamping punch 96 of the rotor core of the lower die 83, a die hole 127 (a receiving part of a laminated core piece) is provided for holding the core piece stamped by the punch 96 to compose the rotor core, and for laminating the core pieces in succession. Further, immediately under the stamping punch 102 of the stator core of the lower die 83, a die hole 128 is provided for holding the core piece stamped by the punch 102 to compose the stator core, and for laminating the core pieces 6A in succession. At the lower sides of the die holes 127, 128, bottom plate blocks 129, 130 are provided for supporting the punched core piece 6A, and are connected to a rotating mechanism furnished in response to a pressing mechanism (not shown) and as needed, go down in response to lamination height of the core pieces, at the same time effect pressure, and rotate the lamination of the core pieces as requested, for example 45 degree.

With such a structure, for laminating the core pieces 6A in the die holes 127, 128, while moving down the bottom plate blocks 129, 130, the laminated core pieces are rotated at desired degree (45 degree) as requested around the axes of the core pieces per predetermined sheets, and the respective core pieces 6A are carried out with caulk-connection, and thus the rotor laminated core and the stator laminated core of desired thickness are produced. The upper die set 87 is equipped with a control mechanism 131 for stopping actuation of the respective punches 93, 94, 95, 99, 100, 101. The pressing apparatus 80 has been explained as example as to the relation between the respective punches and the die plates, showing parts of the punches and dies served to pressing of each of the processes.

Following explanation will be made to productions of rotor core s and stator core s, using the pressing apparatus 80 shown in FIG. 7, in reference to FIG. 8 and Table 1.

forming upper connecting holes at positions rotating 45° with respect to the position of the lower connecting hole, a stage K for forming the caulking projections, and a stage L for punching the core pieces 6A composing the rotor core from the thin sheets 81 and laminating them.

1st Step

As shown in Table 1, in the circumference of the core piece forming area where the core piece 6a is formed in the stage A, the transferring pilot holes 132 are processed at both sides in the width direction of the thin sheet 81. Also in the following steps, since the pilot holes 132 are formed in the stage A, explanation therefore will be omitted. The thin sheet 81 is sent to a next stage.

2nd Step

In the stage B, the shaft holes 133 are processed in the area where the core pieces 6a are formed. Also in the following steps, since the shaft holes 133 are formed in the core piece forming area of the stage B, explanation therefore will be omitted. The thin sheet 81 is sent to a next stage.

3rd Step

In the stage C, the lower connecting holes 68 are formed in the area where the core piece 6a are formed, and the thin sheet 81 is sent to a next stage.

TABLE 1

| | STAGE | | | | | | | | | | | |
|---|---|---|---|---|---|---|---|---|---|---|---|---|
| STEP | A PILOT HOLES | B SHAFT HOLES | C HOLDING THROUGH-HOLE | D HOLDING THROUGH-HOLE | E CAULKING PROJECTION | F LAMINATING | G PUNCHING SLOTS | H PUNCHING SLOTS | I HOLDING THROUGH-HOLE | J HOLDING THROUGH-HOLE | K CAULKING PROJECTION | L LAMINATING |
| 1 | (6a) ○ | | | | | | | | | | | |
| 2 | (6b) ○ | (6a) ○ | | | | | | | | | | |
| 3 | (6c) ○ | (6b) ○ | (6a) ○ | | | | | | | | | |
| 4 | (6d) ○ | (6c) ○ | (6b) | (6a) | | | | | | | | |
| 5 | (6e) ○ | (6d) ○ | (6c) ○ | (6b) ○ | (6a) ○ | | | | | | | |
| 6 | (6f) ○ | (6e) ○ | (6d) | (6c) | (6b) | (6a) R | | | | | | |
| 7 | (6g) ○ | (6f) ○ | (6e) ○ | (6d) ○ | (6c) ○ | (6b) | (6a) ○ | | | | | |
| 8 | (6h) ○ | (6g) ○ | (6f) | (6e) | (6d) | (6c) R | (6b) ○ | (6a) ○ | | | | |
| 9 | (6i) ○ | (6h) ○ | (6g) ○ | (6f) ○ | (6e) ○ | (6d) | (6c) ○ | (6b) ○ | (6a) ○ | | | |
| 10 | (6j) ○ | (6i) ○ | (6h) | (6g) | (6f) | (6e) R | (6d) ○ | (6c) ○ | (6b) | (6a) | | |
| 11 | (6k) ○ | (6j) ○ | (6i) ○ | (6h) ○ | (6g) ○ | (6f) | (6e) ○ | (6d) ○ | (6c) ○ | (6b) ○ | (6a) | |
| 12 | (6l) ○ | (6k) ○ | (6j) | (6i) | (6h) | (6g) R | (6f) ○ | (6e) ○ | (6d) | (6c) | (6b) | (6a) R |
| 13 | (6m) ○ | (6l) ○ | (6k) ○ | (6j) ○ | (6i) ○ | (6h) | (6g) ○ | (6f) ○ | (6e) ○ | (6d) ○ | (6c) ○ | (6b) |
| 14 | (6n) ○ | (6m) ○ | (6l) | (6k) | (6j) | (6i) R | (6h) ○ | (6g) ○ | (6f) | (6e) | (6d) | (6c) R |
| 15 | (6o) ○ | (6n) ○ | (6m) ○ | (6l) ○ | (6k) ○ | (6j) | (6i) ○ | (6h) ○ | (6g) ○ | (6f) ○ | (6e) ○ | (6d) |
| 16 | (6p) ○ | (6o) ○ | (6n) | (6m) | (6l) | (6k) R | (6j) ○ | (6i) ○ | (6h) | (6g) | (6f) | (6e) R |

HEREAFTER, STEPS 13 TO 16 ARE REPEATED. (THERE IS A STEP FOR REMOVING LAMINATED CORE HAVING A PREDETERMINED LAMINATION THICKNESS FROM DIE.)
WHERE SYMBOL ○ REPRESENTS PERFORMING A PROCESS, AND "R" REPRESENTS ROTATING A LAMINATED CORE 45°

Figure 8:
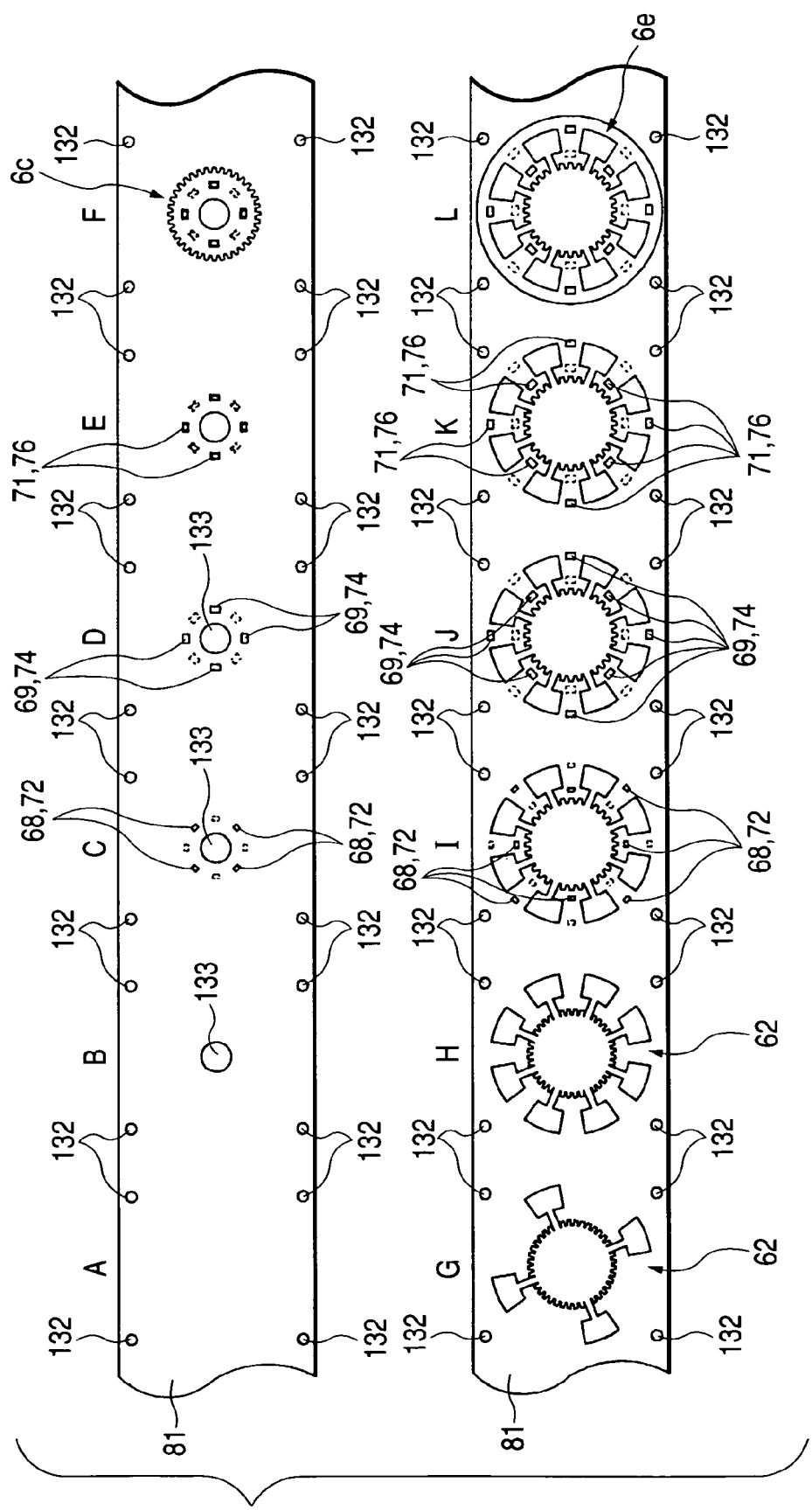
FIG. 8 is an explanatory view showing the punching process of the laminated core.

As shown in FIG. 8, the pressing apparatus 80 has A to L stages. That is, there are equipped a stage A for processing pilot holes 132 for transferring a thin sheet 81, a stage B for forming shaft holes 133 of the rotor core, a stage C for forming lower connecting holes, a stage D for forming upper connecting holes at positions rotating 45° with respect to the position of the lower connecting hole, a stage E for forming the caulking projections, and a stage F for punching and laminating the core pieces 6A composing the rotor core from the thin sheets 81 and laminating them.

Further, the pressing apparatus 80 is equipped with a stage G (processing first slots 62) for stepwise punching slots for the stator core, followed by punching the core pieces 6A for forming the rotor core, a stage H (processing second slots 62), a stage I for forming lower connecting holes, a stage J for 4th Step The control mechanism 131 is operated to stop actuation of the punches 93, 94. Consequently, in the stages C and D, the pressing work is stopped, and the thin sheet 81 is sent to a next stage.

5th Step

The control mechanism 131 is operated to stop actuation of the punch 95. In the stage C, the lower connecting holes 72 are formed in the area where the core piece 6c is formed. In the stage D, the upper connecting holes 69 are formed in the area where the core piece 6b is formed. In the stage E, the pressing work is stopped, and the thin sheet 81 is sent to a next stage.

6th Step

The control mechanism 131 is operated to stop actuation of the punches 93 to 95. Consequently, in the steps C to E, the process is stopped. In the stage F, the core pieces 6a are punched by the stamping punch 96, and laminated on the bottom plate block 129 within the die hole 127. Subsequently, the core pieces laminated on the bottom plate block 129 are rotated 45° as needed. The thin sheet 81 is sent to a next stage.

7th Step

In the stage C, the lower connecting holes 72 are formed in the area where the core pieces 6e are formed. In the stage D, the upper connecting holes 74 are formed in the area where the core piece 6d is formed. In the stage E, the caulking projections 71 are processed in the area where the core piece 6c is formed. Thereby, the lower connecting holes 72 and the caulking projection 71 are formed in the area where the core piece 6c is formed. In the stage F, the core pieces 6b are punched by the stamping punch 96, and laminated on the previously laminated core pieces 6a within the die hole 127, so that the connecting through hole 70 is formed (the A Step of the invention) In the stage G, the first slot 62 is processed by the punch 97 in the area where the core piece 6a is formed. In the following step, the stage G is processed as to the area where the core pieces are formed, and so description therefore is omitted. The thin sheet 81 is sent to a next stage.

8th Step

The control mechanism 131 is operated to stop actuation of the punches 93 to 95. Consequently, in the stages C to E, the process is stopped. In the stage F, the core pieces 6c are punched by the stamping punch 96, and laminated on the previously laminated core pieces 6b within the die hole 127, and the caulking projection 71 goes into the connecting through hole 70, so that the caulking coupling is generated to form the first laminated group 73 (the B Step of the invention). Subsequently, the first group 73 is rotated 45°. In the stage H, the second slot 62 is processed by the punch 98 in the area where the core piece 6a is formed (in the following, explanation for the same process will be omitted). Thereby, all the slots 62 are accomplished in the area where the core piece 6a is formed. The thin sheet 81 is sent to a next stage.

9th Step

In the stage C, the lower connecting holes 72 are formed in the area where the core pieces 6g are formed. In the stage D, the upper connecting holes 69 are formed in the area where the core piece 6f is formed. In the stage E, the caulking projections 76 are processed in the area where the core piece 6e is formed. Thereby, the lower connecting hole 68 and the caulking projection 76 are formed in the area where the core piece 6e is formed. In the stage F, the core pieces 6d are punched by the stamping punch 96, and laminated on the previously laminated core pieces 6c within the die hole 127, so that the connecting through hole 75 is formed (the C Step of the invention). In the stage I, the lower connecting hole 68 is formed in the area where the core piece 6a is formed. The thin sheet 81 is sent to a next stage.

10th Step

The control mechanism 131 is operated to stop actuation of the punches 93 to 95, 99 and 100. In the stages C to E, the process is stopped. In the stages F, the core pieces 6e are punched by the stamping punch 96, and laminated on the previously laminated core pieces 6d within the die hole 127, and the caulking projection 76 goes into the connecting through hole 75, and at the same time the caulking coupling is generated to form the second laminated group 77 (the B Step of the invention). Subsequently, the bottom plate block 129 is rotated 45° if necessary. In the steps I and J, the process is stopped. The thin sheet 81 is sent to a next stage.

11th Step

The control mechanism 131 is operated to stop the actuation of the punch 101. Herein, since the process in the step A to F is the same as that of the stages A to F, detailed explanation will be omitted. In the stage I, the lower connecting holes 72 are formed in the area where the core piece 6c is formed. In the stage J, the upper connecting hole 69 is formed in the area where the core piece 6b is formed. In the stage K, the pressing work is stopped, and the thin sheet 81 is sent to a next stage.

12th Step

The control mechanism 131 is operated to stop actuation of the punches 93 to 95, 99 to 101. Herein, since the process in the stages A to F (in particular, A to G) is the same as that of the stages A to F of the 8th step, detailed explanation will be omitted. In the stages I to K, the process is stopped. In the stages L, the core pieces 6a are punched by the stamping punch 102, and laminated on the bottom plate block 130 within the die hole 128. Subsequently, the bottom plate block 129 is rotated 45° if necessary. In the stages I and J, the process is stopped. The thin sheet 81 is sent to a next stage.

13th Step

Since the process in the stages A to H is the same as that of the stages A to H of the 9th step, detailed explanation will be omitted. In the stage I, the lower connecting holes 68 are formed in the area where the core piece 6e is formed. In the stage J, the upper connecting hole 74 is formed in the area where the core piece 6d is formed. In the stage K, the caulking projection 71 is processed in the area where the core piece 6c is formed. Thereby, the lower connecting hole 72 and the caulking projection 71 are formed in the area where the core piece 6c is formed. In the stage L, the core pieces 6b are punched by the stamping punch 102, and laminated on the previously laminated core pieces 6a within the die hole 128, so that the connecting through hole 70 is formed (the A Step of the invention), and the thin sheet 81 is sent to a next stage.

14th Step

The control mechanism 131 is operated to stop the actuation of the punches 93 to 95, 99 to 101. Herein, since the process in the stages A to I is the same as that of the stages A to I of the 10th step, detailed explanation will be omitted. In the stages J and K, the process is stopped. In the stages L, the core pieces 6c are punched by the stamping punch 102, and laminated on the previously laminated core pieces 6b within the die hole 128, and the caulking projection 71 goes into the connecting through hole 70, and at the same time the caulking coupling is generated to form the first laminated group 73 (the B Step of the invention). Subsequently, the bottom plate block 129 is rotated 45° if necessary, and the thin sheet 81 is sent to a next stage.

15th Step

Since the process in the stages A to J is the same as that of the stages A to J of the 11th step, detailed explanation will be omitted. In the stage K, the caulking projection 76 is processed in the area where the core piece 6e is formed. Thereby, the lower connecting hole 68 and the caulking projection 76 are formed in the area where the core piece 6e is formed. In the stage L, the core pieces 6d are punched by the punch 102, and laminated on the previously laminated core pieces 6c within the die hole 128, so that the connecting through hole 75 is formed (the C step of the invention), and the thin sheet 81 is sent to a next stage.

16th Step

The control mechanism 131 is operated to stop the actuation of the punches 93 to 95, 99 to 101. Herein, since the process in the stages A to K is the same as that of the stages A to K of the 12th step, detailed explanation will be omitted. In the stages L, the core pieces 6e are punched by the punch 102, and laminated on the previously laminated core pieces 6d within the die hole 128, and the caulking projection 76 goes into the connecting through hole 75, and at the same time the caulking coupling is generated to form the first laminated group 77 (the B step of the invention). At this time, the caulking coupling is also carried out between the first laminating sheets group 73 and the second laminating sheets group 77. Subsequently, the bottom plate block 130 is rotated 45°, and the thin sheet 81 is sent to a next stage.

17th Step and the Following

In the 17th step and the following, the 13th to 16th steps are repeated. Incidentally, in the die holes 127, 128, the laminated core 61 gradually increases thickness each time when the caulking coupling is generated, and so the bottom plate blocks 129, 130 are slowly moved down by use of a pressure mechanism (for example, a hydraulic cylinder, not shown). When laminating until the predetermined thickness, the laminated core is removed under the die holes 127, 128. A final process, in the laminated core of the rotor, is finished by laminating the core piece defined with the caulking projections (the stage F). The laminated core of the stator is finished by laminating the core piece defined with the caulking projections (the stage L). In this case, holes (the lower connecting holes) punched in the core piece of the final stage may be omitted.

By the way, in this embodiment, in order that the positions defined with the caulking projections are not overlapped by the core layers neighboring up and down (for example, the first laminated sheets group 73, the second laminated sheets group 77, and the third laminated sheets group 78), the core pieces 6c, 6e, 6g defined with the caulking projections are laminated, followed by rotating (i.e., of the lamination) the laminated core pieces at the predetermined angle (45°), but, instead, it is available that the stage number of punching process is increased so as to select the punches to be served per each of the core pieces, and change the ls and the positions of the caulking projections to be fitted therein per each of the core layers neighboring up and down, so that the laminated core is produced. In such a case, the rotation of the laminated core pieces within the die hole is not carried out. Also in this case, it is possible to furnish a plurality of selected punches in one stage for reducing the stage number of pressing process.

Successively, referring to FIG. 9, explanation will be made to the production of the laminated core in the fourth embodiment.

In the stage A, the thin sheet 143 of the magnetic material punched with four pilot holes 141, 142 is formed with the core pieces of a rotor core and a stator core in area (called as the "core piece forming area") surrounded with the four pilot holes 141, 142. The core piece forming areas surrounded with the pilot holes 141, 142 are defined with shaft holes (axis holes) in the stage B. In the next stage C, the lower connecting holes of the four connecting through holes 145 are defined (the punched holes). The four connecting through holes 145 are arranged at the angular positions of 0°, 90°, 180°, and 270° with respect to the standard being the center of the core piece forming area. As to the core piece forming area (the thin sheet) sent to the stage C, the upper connecting holes forming the connecting through holes 145 are formed, while as to the subsequently sent thin sheet 143, the lower connecting holes are formed which form the connecting through holes 145 of the same radius at the position of 45 degree of the same radius, with respect to the caulking projections for fitting in the connecting through holes 145 as well as the respective connecting through holes 145. By the way, in the stage C, each time when forming different connecting holes and caulking projections, different punches and dies are used.

The next stage D is for laminating the rotor core, and there are laminated, at first, the core pieces 146 of the rotor core defined with the lower connecting holes of the connecting through holes 145, secondly, the core pieces 146 of the rotor core defined with the upper connecting holes of the connecting through holes 145, and thirdly, the core pieces defined with the lower connecting holes of the connecting through holes at the position of 45° with respect to the caulking projection. At the step of finishing this lamination, the rotation is done toward the predetermined position of 45° in order that the caulking projection fitted in the connecting through hole 145 comes to the shown position of the connecting through hole 145.

Subsequently, the core pieces 146 of the rotor core defined with the upper connecting holes are laminated, and further thereon, the core pieces defined with the lower connecting holes are laminated at the position of 45° with respect to the caulking projection, and the laminated core pieces are rotated toward the predetermined position of 45°. Passing through these steps, the laminated core of the rotor is formed at the predetermined height.

The core piece forming area where the rotor core has been punched out are punched with the slots 147 forming the magnetic poles of the stator core in the stage E, and in the next stage F, the core piece forming area of the thin sheet successively sent are formed with the upper and lower connecting holes (punched holes) forming the four connecting through holes 148 outside and the four connecting through holes 149 inside as well as the caulking projections. The stage G is the area for laminating the stator core, and there are laminated, at first, the core pieces 150 of the stator core defined with the lower connecting holes, secondly, the core pieces 150 of the stator core defined with the upper connecting holes, and thirdly, the core pieces 150 of the stator core defined with the caulking projections for fitting the ls formed with the upper and lower connecting holes. The core piece defined with the caulking projections is formed with the lower connecting holes (eight) at the 45° positions. When laminating the core piece 150 of the stator core formed with the caulking projections, the die supporting the laminated core is rotated in the predetermined direction of 45° (rotation of the lamination), and as shown in the illustrated stage G, the lower connecting holes forming the lower connecting holes are positioned at the place where the caulking projection has been present, and so the core pieces 150 of the stator core formed with the connecting holes are successively laminated thereon, and the core pieces 150 of the stator core formed with the connecting holes are successively laminated further thereon. As laminating the rotor core, by repeating the above steps, the laminated core of the stator core is accomplished.

In the production of the laminated core of the fourth embodiment, the punches and the corresponding dies are changed in the stage C and the stage F for forming the plurality of connecting through holes and caulking projections, but as shown in the third embodiment, it is naturally possible to divide them into the plural stages and perform the pressing work.

In the precedent embodiments, the caulking projection is nearly trapezoidal, and may be nearly multi-trapezoidal in coinciding to sizes of the connecting through holes defined in the core pieces of the respective layers.

Further, the invention is not limited to the above mentioned embodiments, and so far as the subject matter of the invention is not changed, improvements or modifications are of course available. The invention is applicable to the cases of composing the laminated core by combination of the above 1st to 4th embodiments or of producing it.

INDUSTRIAL APPLICABILITY

As to the embodiment of the invention, the caulking projections defined in one sheet of the core piece are fitted in the connecting through holes formed in a plurality of core pieces, so that the caulking couplings are provided to laminate and combine many sheets of core pieces, and the caulking couplings neighboring up and down are changed in the lamination-forming positions. Accordingly, even if thickness of the core piece is small, the caulking projections are fitted in the connecting through holes defined in a plurality of core pieces, enabling to secure the fitting depth of the caulking projection, whereby the set-up core piece heightens strength.

In the embodiment of the invention, the caulking projection has a base portion reducing the width as going in a front end direction, and, if, among the connecting through holes formed in said plural core pieces, the connecting through hole of the core piece immediately under said core piece formed with the caulking projection has the width widening than said width of said caulking projection, the caulking projections easily fit into the core pieces immediately under the core pieces defined with the caulking projections, and after the core goes a little thereinto, the connecting through hole (the upper connecting hole) of the core is a guide for the caulking projections and the caulking projection is difficult to cause buckling or bending, so that defected products are extremely decreased.

In the embodiment of the invention, when the connecting through hole formed in the core piece is partially defined at circumference with concaves, the caulking projection partially goes into the core at lamination, and the caulking strength increases to make the laminated core still stronger.

In the laminated core of the invention, when the concaves are two or more, and the respective concaves are defined symmetrically with respect to the axis of the connecting through hole, the caulking projection is difficult to generate bias, and as a result, the core causes no divergence in lamination, and bad products are reduced.

In the laminated core of the invention, when the caulking projection is shaped as nearly trapezoidal or nearly multi-trapezoidal viewing from the side thereof, the corner of the caulking projection bites into the connecting through hole, or no twist is generated in the caulking projection. Therefore, the laminated core increases strength, and the caulking projection is difficult to cause twist.

In the laminated core of the invention, when the caulking projection has a front end portion widening the width owing to pressure, the caulking projection and the connecting through hole are caught accurately, so that the stronger laminated core can be produced.

A method of producing laminated cores according to the invention, is such a method where caulking projections and connecting through holes are formed in many sheets of core pieces punched in magnetic thin sheets by a pressing apparatus, and caulking connection is performed while laminating these core pieces, and comprises: an A step of punching the plural sheets of core pieces formed with the connecting through holes in the magnetic thin sheets by means of the pressing apparatus, a B step of forming caulking projections passing until the bottoms of the connecting through holes formed in the plural sheets of core pieces laminated in the precedent step, and laminating core pieces formed, in upper places, with punched holes forming parts of connecting through holes for fitting new caulking projections formed in places different from those of said caulking projections, and a C step of laminating core pieces formed with punched holes to be parts of the connecting through holes formed by meeting axes to said punched holes of said core pieces laminated in the B step, and forming plural sheets of core pieces defined with the connecting through holes together with said core pieces laminated in the B step, wherein the B step and the C step are repeated to form the core laminated at a predetermined thickness in said B step as a final process. Thereby, it is possible to produce the laminated core by use of the pressing apparatus, changing places, where the caulking projections bite into a plurality of core pieces, in the laminating direction neighboring in the vertical direction.

In the method of producing the laminated core according to the invention, in the B step as said final process, if a process forming the punched hole for defining said connecting through hole is omitted, a useless punching process at the uppermost part of the laminated core can be removed, so that the outer appearance is heightened.

In the method of producing the laminated core according to the invention, if the laminated core is made of a motor core, and after the B step, the laminated core pieces are rotated, even if the cores have uneven thickness, the laminated core of fixed thickness may be formed.

In the method of producing the laminated core according to the invention, if the length (thickness) of the caulking projection is larger than a full length of the connecting through hole for fitting the caulking projection, while the caulking projection has a base portion widening the width, and a front end portion of the caulking projection is crushed (that is, widening the width) when laminating, the caulking projection and the connecting through hole are caught accurately, and the laminated core is made still stronger.

In the method of producing the laminated core according to the invention, if the connecting through hole is evenly defined with a plurality of concaves at least at lower circumference, the caulking projection is fitted at the part thereof in the concave to check the caulking projection from getting out.

The invention claimed is:

1. A laminated core comprising:
a plurality of core pieces including: a) a first core piece having a thickness between first and second oppositely facing sides, the first core piece made from metal and formed with caulking projections each having a projecting length extending from one of the oppositely facing sides; and b) a second core piece made from metal and formed with connecting through holes that fit said caulking projections, said second core piece laminated under said first core piece,
wherein each of the connecting through holes has a circumference at which at least one discrete cut out is formed,
wherein the caulking projections on the first core piece are forced into the first connecting through holes so that a part of each of the caulking projections is deformed by biting into one of the discrete cut outs and the caulking projections are securely fixed in the connecting through holes to thereby maintain the first core piece and the second core piece together.

2. The laminated core as set forth in claim 1, wherein the caulking projections on the first core piece have a base portion having a width that is reduced going in a front end direction, the plurality of core pieces comprises a third core piece made from metal and formed with connecting through holes that fit said caulking projections on the first core piece, the third core piece immediately under the first core piece, the connecting through holes in the third core piece having a width wider than said width of said caulking projections on the first core piece.

3. The laminated core as set forth in claim 1, wherein the connecting through holes in the second core piece each has a first axis, a plurality of the cut outs are formed at the circumference of each of the connecting through holes in the second core piece, and the cut outs are positioned symmetrically to each other with respect to the first axis for each of the connecting through holes.

4. The laminated core as set forth in claim 1, wherein one of the caulking projections is shaped as substantially trapezoidal or substantially multi-trapezoidal viewing from a side thereof.

5. A laminated core comprising:
a plurality of metal core pieces laminated together and each having a thickness between first and second oppositely facing sides, said plurality of core pieces including at least first and second core pieces respectively located in upper and lower positions and a third core piece that is laminated between the first and second core pieces, the first and second core pieces each formed with caulking projections each having a length projecting from one of the sides of the first and second core pieces and connecting through holes at positions different than where the caulking projections are located, the third core piece formed with connecting through holes that fit said caulking projections on the first core piece, the projecting lengths of the caulking projections on the first core piece greater than the thickness of the third core piece so that the caulking projections on the first core piece can pass fully through the connecting through holes in the third core piece before any deformation of the caulking projections and fit to the connecting through holes in the second core piece,
wherein the caulking projections on the first core piece are deformed by widening within the connecting through holes in the second core piece without extending a significant distance from the connecting through holes in the second core piece to firmly secure the caulking projections on the first core piece in the connecting through holes in the second core piece to thereby prevent withdrawal of the caulking projections on the first core piece from the connecting through holes in the second and third core pieces.

6. The laminated core as set forth in 5, wherein one of the caulking projections has a free front end portion with a width that is widened by deformation within a connecting through hole.

7. The laminated core as set forth in claim 5 wherein each of the connecting through holes formed in one of the second and third core pieces has a circumference at which at least one discrete cut out is formed, and the caulking projections on the first core piece extend and bite into the discrete cut outs in the one of the second and third core pieces.

8. The laminated core as set forth in claim 1, wherein a plurality of the caulking projections is shaped as substantially trapezoidal or substantially multi-trapezoidal viewing from a side thereof.

9. The laminated core as set forth in claim 3, wherein one of the caulking projections is shaped as substantially trapezoidal or substantially multi-trapezoidal viewing from a side thereof.

10. The laminated core as set forth in claim 5, wherein one of the caulking projections is shaped as substantially trapezoidal or substantially multi-trapezoidal viewing from a side thereof.

11. The laminated core as set forth in claim 1 wherein the thicknesses of at least two of the core pieces are approximately the same.

12. The laminated core as set forth in claim 1 wherein the first and second core pieces have flat facially engaging surfaces respectively around the caulking projections and connecting through holes.

13. The laminated core as set forth in claim 1 wherein one of the caulking projections on the first core piece is compressed and thereby widened to cause the one of the caulking projections to bite into one of the discrete cut outs.

14. The laminated core as set forth in claim 1 wherein the connecting through holes each has an axis and the first core piece has a connecting through hole that fits a caulking projection of an upper core piece laminated to and on top of the first core piece, the connecting through hole in the first core piece located at a place that is different from a place at which one of the caulking projection is formed in the first core piece, as viewed along the through hole axes.

15. The laminated core as set forth in claim 1 wherein the discrete cut outs each serves as a hook to check a caulking projection from separating from the discrete cut outs.

16. The laminated core as set forth in claim 5, wherein a plurality of the caulking projections is shaped as substantially trapezoidal or substantially multi-trapezoidal viewing from a side thereof.

* * * * *